United States Patent
Venkatesan et al.

(10) Patent No.: US 9,729,660 B2
(45) Date of Patent: Aug. 8, 2017

(54) METHOD AND SYSTEM FOR DETECTING VIRTUAL MACHINE MIGRATION

(71) Applicant: NETAPP, INC., Sunnyvale, CA (US)

(72) Inventors: Vivek Venkatesan, Morrisville, NC (US); Narayan Venkat, Westford, MA (US); Frederick Knight, Cary, NC (US); Kenny Speer, Danville, CA (US)

(73) Assignee: NetApp, Inc., Sunnyvale, CA (US)

( * ) Notice: Subject to any disclaimer, the term of this patent is extended or adjusted under 35 U.S.C. 154(b) by 868 days.

(21) Appl. No.: 13/949,550

(22) Filed: Jul. 24, 2013

(65) Prior Publication Data
US 2015/0032836 A1   Jan. 29, 2015

(51) Int. Cl.
| G06F 9/455 | (2006.01) |
| H04L 29/08 | (2006.01) |
| G06F 9/48 | (2006.01) |
| G06F 12/00 | (2006.01) |

(52) U.S. Cl.
CPC ...... *H04L 67/2842* (2013.01); *G06F 9/45533* (2013.01); *G06F 9/45558* (2013.01); *G06F 9/4856* (2013.01); *G06F 12/00* (2013.01); *G06F 2009/4557* (2013.01)

(58) Field of Classification Search
CPC ............. G06F 9/45533; G06F 9/45558; G06F 2009/4557
See application file for complete search history.

(56) References Cited

U.S. PATENT DOCUMENTS

| 9,311,122 | B2 * | 4/2016 | Guay | |
| 2009/0183173 | A1 * | 7/2009 | Becker | G06F 9/45533 719/313 |
| 2010/0107162 | A1 * | 4/2010 | Edwards | G06F 9/5077 718/1 |
| 2011/0238820 | A1 * | 9/2011 | Matsuoka | G06F 9/5077 709/224 |
| 2011/0307889 | A1 * | 12/2011 | Moriki | G06F 9/45558 718/1 |
| 2011/0314345 | A1 * | 12/2011 | Stern | G06F 11/3466 714/47.1 |
| 2013/0111221 | A1 * | 5/2013 | Fujii | G06F 3/0604 713/193 |
| 2013/0212345 | A1 * | 8/2013 | Nakajima | G06F 3/0605 711/161 |
| 2015/0058580 | A1 * | 2/2015 | Lagar Cavilla | G06F 9/45558 711/149 |

\* cited by examiner

*Primary Examiner* — Jeong S Park
(74) *Attorney, Agent, or Firm* — Cesari and McKenna, LLP

(57) ABSTRACT

Method and system for detecting migration of a virtual machine are provided. The method detects that a first identifier for identifying a virtual machine and a second identifier identifying a source computing system hosting the virtual machine that accesses a storage space via a logical object have changed, when the virtual machine is migrated from the source computing system to a destination computing system. Thereafter, a storage device at the destination computing system is initialized to operate as a caching device for the migrated virtual machine.

20 Claims, 8 Drawing Sheets

METHOD AND SYSTEM FOR DETECTING VIRTUAL MACHINE MIGRATION

TECHNICAL FIELD

The present disclosure relates to storage systems and virtual machines.

BACKGROUND

A virtual machine (VM) environment where a physical resource is time-shared among a plurality of independently operating processor executable VMs is commonly used today. Each VM may function as a self-contained platform, running its own operating system (OS) and computer executable, application software. The computer executable instructions running in a VM may be collectively referred to herein as "guest software." In addition, resources available within the VM may be referred to herein as "guest resources". A computing system (may be referred to as a host system) typically presents VMs to clients.

The guest software expects to operate as if it were running on a dedicated computer rather than in a VM. That is, the guest software expects to control various events and have access to hardware resources on a physical computing system, which may be referred to herein as "host hardware resources". The host hardware resource may include a local caching device, one or more processors, resources resident on the processors (e.g., control registers, and others), memory (instructions residing in memory, e.g., descriptor tables), and other resources (e.g., input/output devices, host attached local storage, network attached storage or other like storage) that reside in a physical machine or are directly coupled to the host platform.

Typically, storage space is presented to a virtual machine as a virtual hard disk (VHD) file by a virtualization layer. A storage drive (for example, C:\) is presented to a user via a user interface within a virtual machine context. The user can use the storage drive to access storage space to read and write information.

Host systems today use locally attached storage device as a cache. Typically, the local caching device is a solid state storage device (SSD) that is attached to the host system. A VM machine is typically presented with a logical storage object (logical storage number (LUN)) to use the local caching device as a cache for read and write operations.

VMs may be migrated from a source host platform to a destination platform. When a VM is migrated, the local caching device at the destination platform is different from the source platform. The contents of the caching device at the destination are typically not available immediately after migration. Conventional processor executable modules that enable the use of the local caching device may not be able to detect VM migration. It is desirable to efficiently detect VM migration and enable the continued use of local caching devices.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIGS. 2-3A-3B shows process flow diagrams, according to one embodiment; and

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
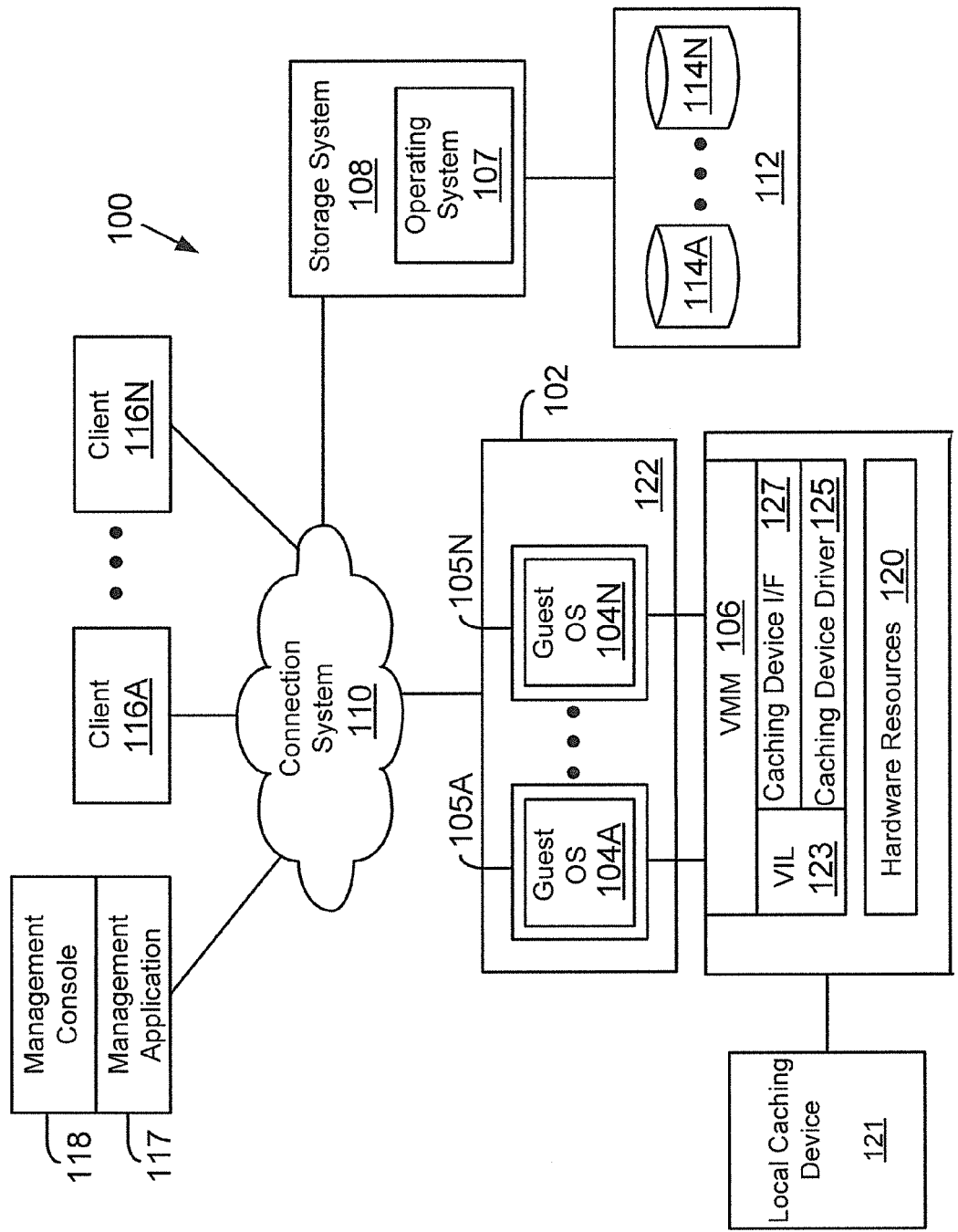
FIG. 1A shows an example of an operating environment for the various embodiments disclosed herein.

System 100:

FIG. 1A shows an example of a system 100, where the adaptive embodiments disclosed herein may be implemented. System 100 includes a virtual machine (VM) environment where a physical resource is time-shared among a plurality of independently operating processor executable VMs 105A-105N.

In one embodiment, system 100 includes at least a computing system 102 (may also be referred to as a host platform 102 or server 102) hosting VMs 105A-105N and communicably coupled to a storage system 108 executing a storage operating system 107 via a connection system 110 such as a local area network (LAN), wide area network (WAN), a storage area network (SAN), the Internet and others. As described herein, the term "communicably coupled" may refer to a direct connection, a network connection, or other connections to enable communication between devices.

System 100 may also include a management console 118 that executes processor executable instructions, for example, a management application 117 for managing and configuring various elements of system 100, as described below in detail. One or more client computing systems 116A-116N (may also be referred to as client system 116) may also be provided for accessing the VMs 105A-105N.

Host platform 102, management console 118 and client system 116 may be general purpose computers having a plurality of components. As described below in more detail, these components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

Host platform 102 provides a processor executable virtual machine environment 122 executing the plurality of VMs 105A-105N. VMs 105A-105N execute a plurality of guest OS 104A-104N (may also be referred to as guest OS 104) that share hardware resources 120. Hardware resources 120 may include a local caching device (may be referred to as caching device) 121, CPU, memory, I/O devices, storage or any other hardware resource. The use of local caching device 121 is described below in more detail.

In one embodiment, system 100 may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host platform 102.

In one embodiment, VMM 106 may be executed by host platform 102 with VMs 105A-105N. In another embodiment, VMM 106 may be executed by an independent stand-alone computing system, often referred to as a hypervisor server or VMM server and VMs 105A-105N are presented on another computing system (for example, 102). It is noteworthy that various vendors provide virtualization environments, for example, VMware Corporation, Microsoft Corporation and others. The generic virtualization environment described above with respect to FIG. 1A may be customized depending on the virtual environment provider.

VMM 106 may include or interface with a virtualization layer (VIL) 123 that provides one or more virtualized hardware resource to each OS 104A-104N. VIL 123 may include or interface with a caching device driver 125 and a plug-in, caching device interface 127, according to one embodiment. The caching device driver 125 is used to interface with the local caching device 121. The caching device interface 127 interfaces between the caching device driver and VIL 123 to read and write information at the local caching device 121 as described below in detail. In one embodiment, VIL 123 may also include a storage stack, a network stack and other layers, details of which are not germane to the embodiments disclosed herein.

In one embodiment, the storage system 108 has access to a set of mass storage devices 114A-114N (may be referred to as storage devices 114) within at least one storage subsystem 112. The storage devices 114 may include writable storage device media such as magnetic disks, video tape, optical, DVD, magnetic tape, non-volatile memory devices for example, self-encrypting drives, flash memory devices and any other similar media adapted to store structured or non-structured data. The storage devices 114 may be organized as one or more groups of Redundant Array of Independent (or Inexpensive) Disks (RAID). The embodiments disclosed are not limited to any particular storage device or storage device configuration.

The storage system 108 provides a set of storage volumes to the host platform 102 via connection system 110. The storage operating system 107 can present or export data stored at storage devices 114 as a volume. Each volume may be configured to store data files (or data containers or data objects), scripts, word processing documents, executable programs, and any other type of structured or unstructured data. From the perspective of one of the client systems, each volume can appear to be a single disk drive. However, each volume can represent the storage space in one storage device, an aggregate of some or all of the storage space in multiple storage devices, a RAID group, or any other suitable set of storage space. An aggregate is typically managed by storage operating system 107 and identified by a unique identifier (not shown). It is noteworthy that the term "disk" as used herein is intended to mean any storage device/space and not to limit the adaptive embodiments to any particular type of storage device, for example, hard disks.

The storage system 108 may be used to store and manage information at storage devices 114 based on a request generated by a management console 118, client system 116 and/or a VM. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

In a typical mode of operation, one or more input/output (I/O) commands, such as an NFS or CIFS request, is sent over connection system 110 to the storage system 108. Storage system 108 receives the request, issues one or more I/O commands to storage devices 114 to read or write the data on behalf of the client system, and issues an NFS or CIFS response containing the requested data over the network 110 to the respective client system.

Although storage system 108 is shown as a stand-alone system, i.e. a non-cluster based system, in another embodiment, storage system 108 may have a distributed architecture; for example, a cluster based system that may include a separate N-("network") blade and D-(data) blade. Briefly, the N-blade is used to communicate with host platform 102 and clients 116, while the D-blade is used to communicate with the storage devices 114 that are a part of a storage subsystem. The N-blade and D-blade may communicate with each other using an internal protocol.

Alternatively, storage system 108 may have an integrated architecture, where the network and data components are included within a single chassis. The storage system 108 further may be coupled through a switching fabric to other similar storage systems (not shown) which have their own local storage subsystems. In this way, all of the storage subsystems can form a single storage pool, to which any client of any of the storage servers has access.

Figure 1B:
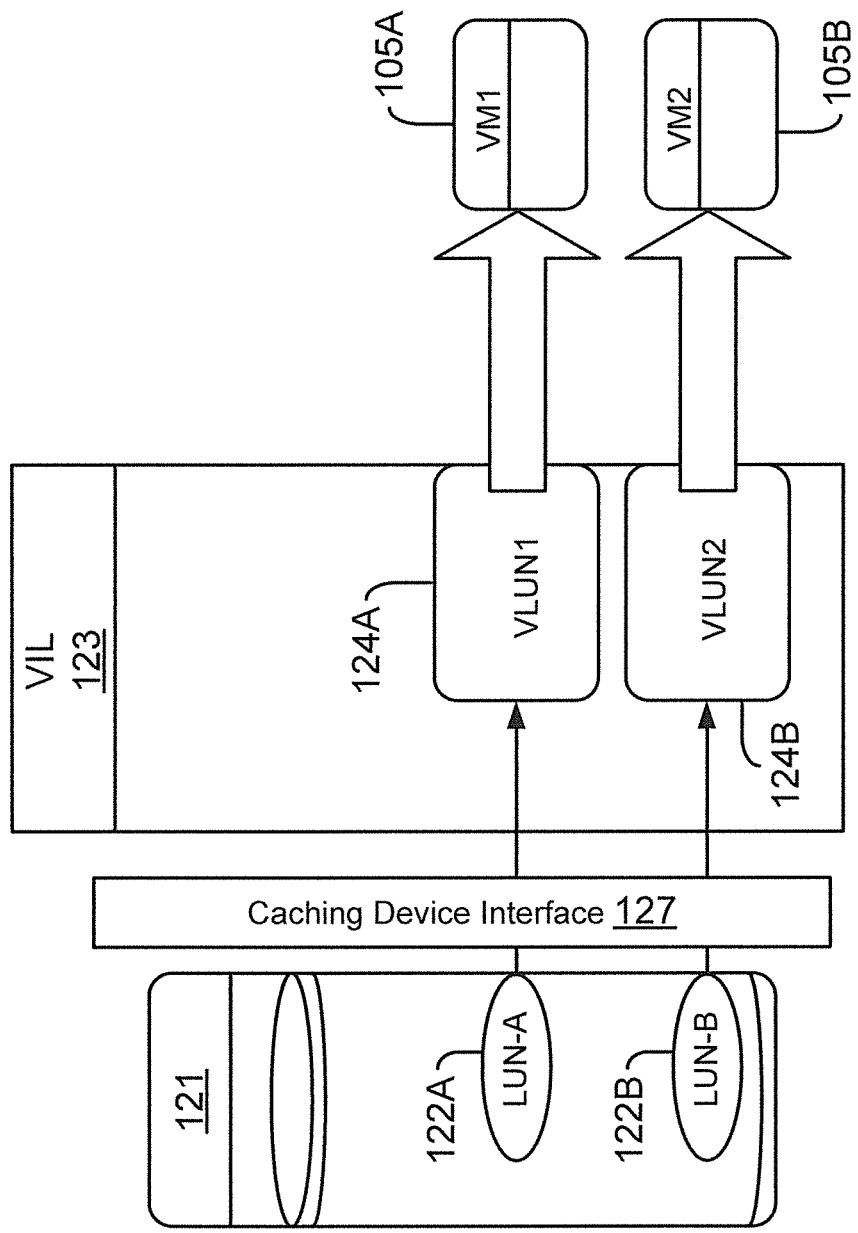
FIG. 1B shows an example of presenting storage space to a virtual machine using a virtual logical unit number (VLUN), according to one embodiment.

Before describing the details of the various embodiments, the following provides an example of presenting logical storage space (for example, logical unit numbers (LUNs) LUN-A 122A and LUN-B 122B) at the local caching device 121 to one or more VMs with respect to FIG. 1B. Caching device interface 127 typically presents the logical storage space at the local caching device 121 as a virtual LUN (VLUN) to the VMs via VIL 123. For example, VLUN1 124A is presented to VM 105A and VLUN2 124B is presented to VM 105B. The VLUNs may be used by the VMs as a local cache for responding to client requests or for any other reason.

Figure 1C:
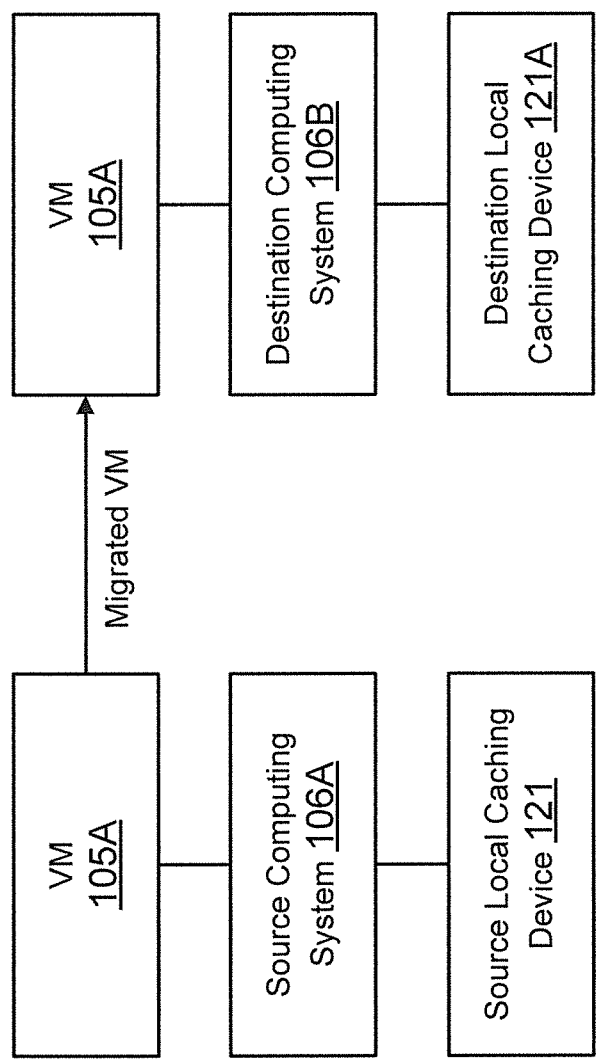
FIG. 1C shows an example of migrating VMs, according to one embodiment.

VMs may be migrated from one host computing system to another. This is shown in FIG. 1C. VM 105A is hosted by a source computing system 106A (similar to 102 of FIG. 1A) having access to the local caching device 121. VM 105A is migrated to a destination computing system 106B that has access to another local caching device 121A.

When VMs are migrated, it is desirable to ensure that all storage and other resources are available at the destination computing system. However, the use of local caching device 121 poses a challenge for a migrated VM. In conventional systems, when a VM is migrated, there is no effective way for the caching driver 135 and caching device interface 127 to detect the migration. The caching device 121 may have cached data that is not available at the caching device 121A. This can be challenging for a migrated VM that expects to use local cache 121 at the destination system.

The embodiments disclosed herein provide an efficient solution for migrated VMs to use local caching devices, as described below in detail.

Figure 1D:
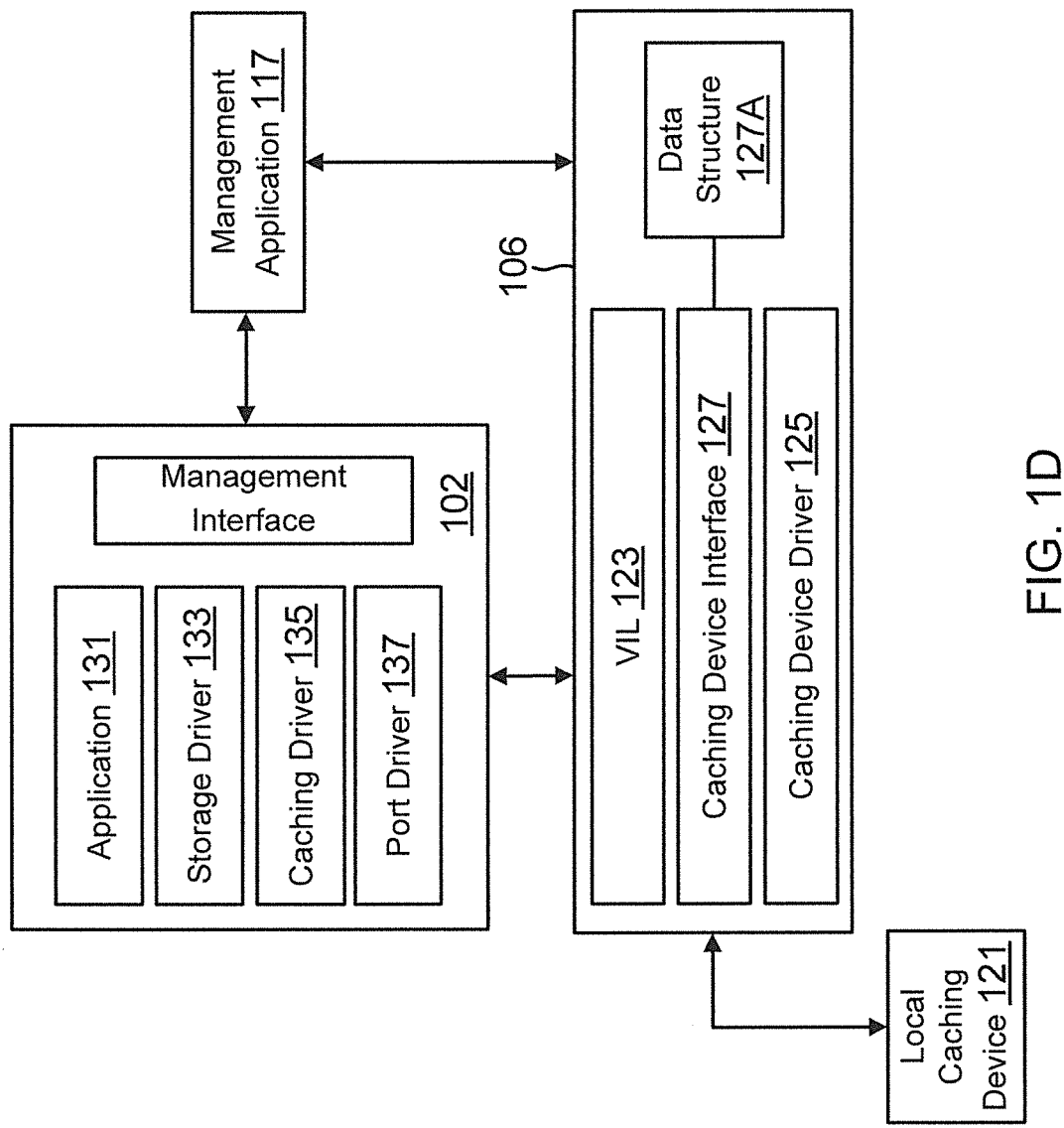
FIG. 1D shows an example of various modules executed by the system of FIG. 1A, according to one embodiment.

FIG. 1D shows a block diagram of various modules that may be used in a VM 105 and VMM 106, according to one embodiment for detecting VM migration and executing various process blocks for enabling the use of local caching device 121A. An application 131 may be executed within the context of VM 105A. Application 131 may be an email application, a database application or any other application that may use mass storage for storing information. A storage driver 133 is used for managing I/O requests that are received from application 131. Storage driver 133 takes a client request and transforms it into a storage request complying with one or more protocols, for example, the SCSI (small computer system interface) protocol. A port driver 137 is used to communicate with an adapter port (not shown) to communicate with another network device for sending the I/O request.

VM 105A also executes a caching driver 135, according to one embodiment. The caching driver 135 may also be referred to as a filter driver. The caching driver 135 assists in executing read and write operations using the local caching device 121. Details of using the caching driver 135 are provided below.

VM 105A also executes a management interface 117A (may also be referred to as a management agent) that interfaces with management application 117 executed at management console 118. Management application 117 sends configuration and management related instructions to configure and manage various modules of VM 105A via the management interface 117A.

VMM 106 executes the caching device interface 127 and the caching device driver 125 to interface with the local caching device 121. As an example, the caching device interface 127 is a plug-in module in an ESX virtual machine environment provided by VMWare Corporation. The caching device interface 127 may be provided by the storage system 108 provider. As shown in FIG. 1B, the caching device interface 127 is configured create, present and manage VLUNs at caching device 121 to VIL 123.

The caching device interface 127 stores a data structure 127A at a memory location that includes information regarding the LUNs that are presented to VM 105A. The data structure 127A includes a LUN identifier value that identifies the LUN, a LUN size that indicates the size of the LUN, an identifier identifying a VM that is assigned to the LUN, any permissions that may be associated with the LUN, a time stamp and an attribute indicating that the LUN is for a non-local device, even though it is used as a local caching device. This allows a VM to be migrated and use the local caching device 121 at the destination computing system 106B.

Figure 2:
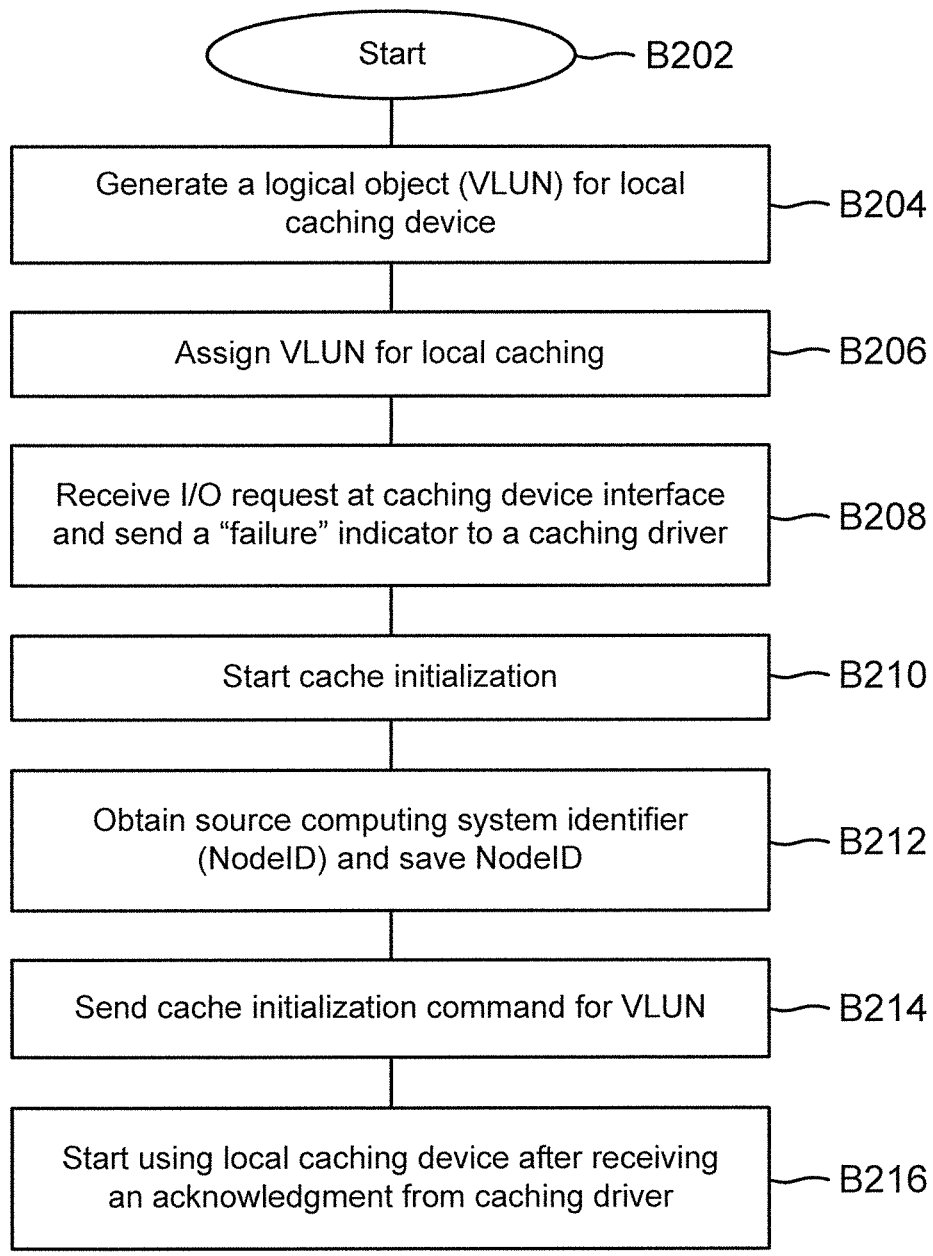

FIG. 2 shows a process 200 for initializing and managing a VLUN, according to one embodiment. The process steps may be executed by VM 105A, management console 118 and VMM 106 components. The process begins in block B202, when management console 118, VM 105A and VMM 106 are initialized and operational.

In block B204, a VLUN is generated for using storage space at local caching device 121. As mentioned above, the VLUN is a storage object having attributes that allows an application to store information. The VLUN may be configured using management application 117. The VLUN attributes are stored at data structure 127A that is managed by the caching device interface 127. This VLUN may be accessed by a storage layer within VIL 123 that eventually presents the VLUN to a VM, to the storage driver 133 that performs a scan of devices that are presented to the VM and to the caching driver 135 that reads from and writes to the VLUN.

In block B206, the VLUN is assigned to a VM, for example, 105A. As mentioned above, the VLUN is generated by the caching device interface 127 and presented by the VIL 123. In block B208, an I/O request is received by the caching device interface 127 to read or write to the VLUN. The caching device interface 127 returns a failure command stating "Not Ready Initialization Command Required". The failure command is received by the caching driver 135 that starts an "initialization" process in block B210.

As part of the local caching device initialization, the caching driver 127 obtains an identifier (may be referred to as a node identifier or Node ID) for the computing system that is hosting VM 105A, for example, source computing system 106A. The caching driver 135 obtains the Node ID from VIL 123 that manages all the VMs and stores the Node ID information at a memory location (not shown). The caching driver 135 then stores the information at a system registry (not shown).

In block B214, the caching driver 135 sends an initialization command (start) for the VLUN generated in block B204. In block B216, the caching device interface 127 waits for an acknowledgement from the caching driver 135 that the VLUN at this instance is ready to be used. It is noteworthy that at this instance, an internal VM identifier value (may also be referred to as World ID) for the VLUN is set to zero when the initialization command is received in block B214. This value is later updated when a first request is received from the caching driver 135. The VLUN object maintains the World ID as part of the VLUN data structure 127A.

In one embodiment, as described below with respect to FIGS. 3A and 3B, a change in the World ID and Node ID is used to detect VM migration from the source system 106A to the destination computing system 106B. The migration detection then triggers an initialization sequence at the destination computing system 106B to use the local caching device 121A, as described below.

Figure 3A:
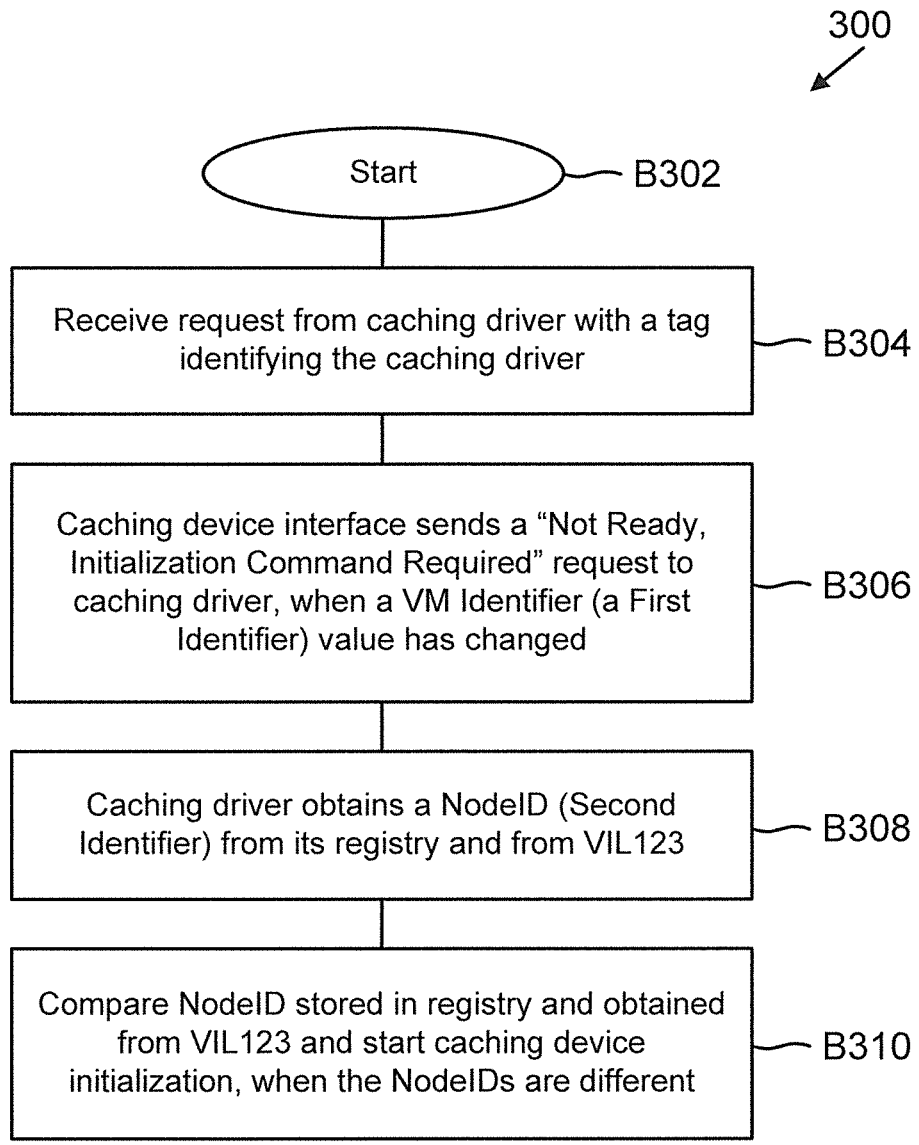

FIG. 3A shows a process 300 for detecting VM migration such that a local caching device 121A can be used at the destination computing system 106B, according to one embodiment. The process begins in block B302 when VM 105A is operational and the local caching device 121 has been configured and is being used.

In block B304, an I/O request is received at the caching device interface 127. The caching device interface 127 in this instance is executed at VMM 106 interfacing with the VMs at the destination computing system 106B. The request includes a tag that identifies the caching driver 135. This indicates to the caching device interface 127 that the request is coming from the local caching device. In one embodiment, the caching driver 135 may insert an identifier field as a tag. The tag may be inserted as part of a Command Descriptor Block (CDB) control byte. SCSI CDBs provide a provision where vendor specific information may be inserted in a CDB control byte. The CDB itself is generated for an I/O request either to read or write data. The embodiments described herein are not limited to SCSI based CDBs.

In block B306, the caching device interface 127 sends a "Not Ready Initialization required" failure command because the caching device interface 127 detects that the World ID of the VM has changed. This can be because the VM has been migrated or if the VM has been re-booted. In order to differentiate between the two, the process has to determine if the Node ID of the source system 106A has changed to the Node ID of the destination computing system 106B. This is ascertained in block 8308, where the caching driver 135 first obtains the Node ID from its registry. The caching driver 135 also sends an inquiry to the caching device driver 125 to obtain the Node ID. VIL 123 provides the Node ID of destination computing system 106B. The caching driver 135 compares the two Node IDs and concludes that the Node ID has changed and then starts the initialization process for local caching device 121A in block B310.

The caching driver 135 first marks the cache as failed. The new Node ID for the destination computing system 106B is added to the registry of the migrated VM 105A. The local caching device 121A may have to be formatted and then re-assigned to VM 105A at destination computing system 106B. Once the local caching device 121A is configured, it can be used to process I/O requests at the destination computing system.

Block 8308 described above is used for what is referred to as "Live Migration" i.e. the VM 105A is migrated while it is being used. The process block is different if the migration is a "cold migration" (i.e. a migration operation when the VM is not being used), a VM reboot, for enabling or disabling the local caching device or simply assigning the caching device. The different options are now described below.

For a cold migration, the caching driver 135 sends a "start command" to initialize the local caching device 121A; formats the cache when the Node IDs don't match and the local caching device is then ready for use.

When the Node ID has not changed, the caching driver 135 initializes the local caching device 121 by sending a start command and then the local caching device is ready for use.

A cache may be disabled and later enabled on the same computing system. In this instance, the caching driver 135 sends a start command and if the Node ID has not changed, then the local caching device is ready for use.

In one embodiment, when a boot driver (not shown) is restored from a snapshot i.e. a point in time copy of the VM, then the information in a registry can go back in time. To avoid this situation, the caching driver uses a time stamp to track when a local caching device was initially used. This information is written to data structure 127A and to the registry. If the time stamp and the Node ID vary, then the sequence for a cold migration is triggered.

Figure 3B:
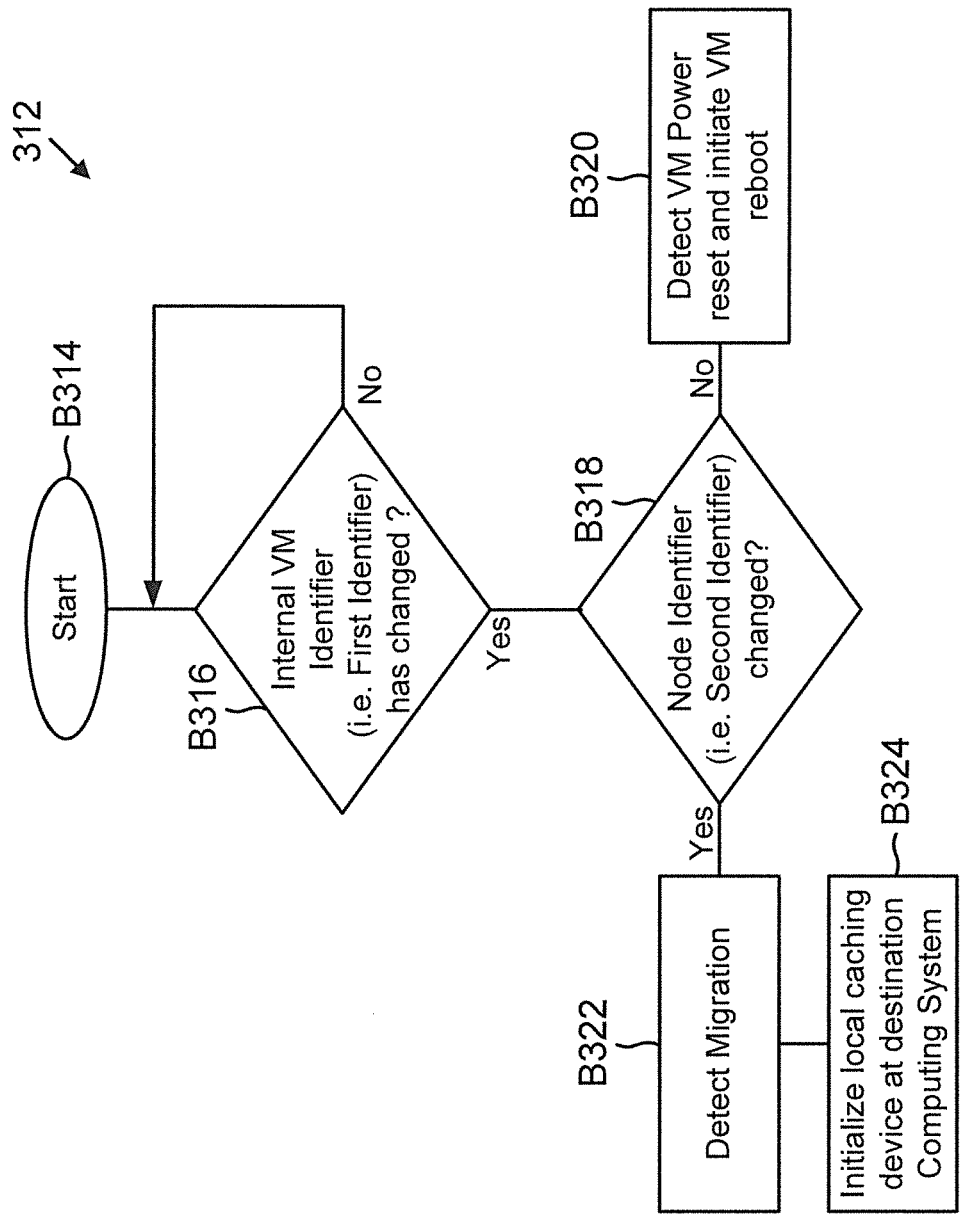

FIG. 3B shows a process 312 for detecting VM migration, according to one embodiment. The process starts in block B314 when the VM is operational using the local caching device 121. If the VM is migrated to the destination computing system 1065, then local caching device 121A needs to be re-initialized.

In block 5316, the process first determines if the World ID (first identifier) of the VM has changed. If not, the process simply loops back where the local caching device 121 is used i.e. no migration has occurred. If the World ID has changed, then the process then determines if the Node ID (second identifier) has changed. If not, then in block 5320, caching driver 135 detects a power reset and VM 105A reboot operation is initialized.

If the Node ID has changed, then in block B322, the VM migration is detected. In block B324, the local caching device 121A is initialized so that the migrated VM 105A can use the VM.

Figure 4:
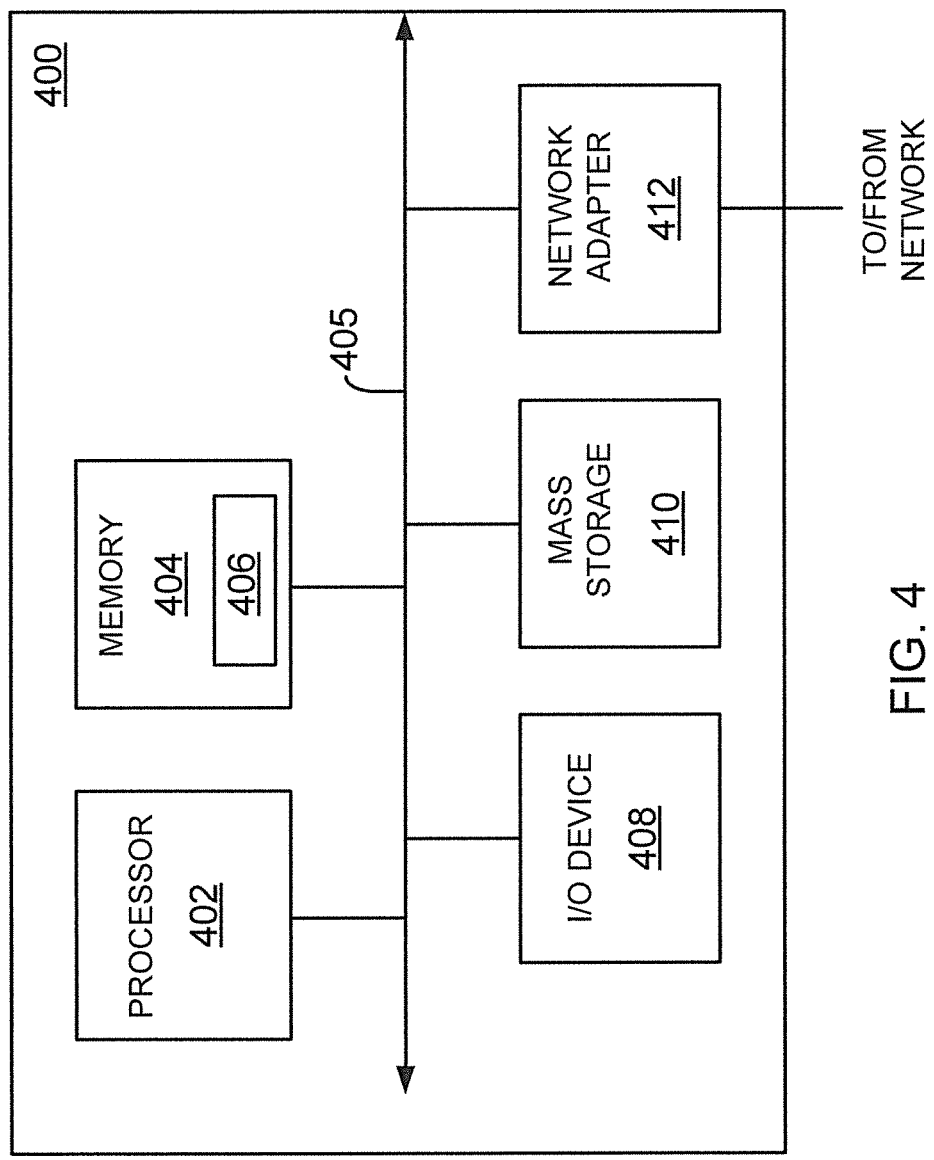
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent host system 102, VMM 106, management console 118, clients 116 and others. Note that certain standard and well-known components which are not germane to the illustrative embodiment are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing process steps for FIGS. 2, and 3A-3B described above in detail.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/ output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive embodiments.

Thus, a method and apparatus for detecting virtual machine migration have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method comprising:
   determining whether a source virtual machine executing on a source computing system is migrated to a destination computing system for execution as a migrated virtual machine by detecting a change of a first identifier identifying the source virtual machine and of a second identifier identifying the source computing system; and
   in response to determining that the source virtual machine is migrated to the destination computing system, initializing a storage device at the destination computing system to operate as a caching device for the migrated virtual machine and caching data stored by the migrated virtual machine at the storage device.

2. The method of claim 1, further comprising:
   initializing, at the source computing system, a logical unit number (LUN) for the source virtual machine; and
   in response to receiving at the source computing system, an input/output request having a specific tag to use the LUN, storing the first identifier as an attribute of the LUN.

3. The method of claim 2, wherein a caching device interface presents the LUN to a virtual interface layer of a virtual machine monitor that presents the LUN to the source virtual machine.

4. The method of claim 2, wherein initializing the storage device further comprises:
   marking at the destination computing system, the LUN as a failed cache and obtaining a value of a third identifier identifying the destination computing system.

5. The method of claim 1, further comprising:
   storing the first identifier in a memory of the source computing system by a caching device interface of a virtual machine monitor of the source virtual machine.

6. The method of claim 1, further comprising:
   in response to the first identifier changing and the second identifier remaining unchanged, sending a start command for a reboot operation of the source virtual machine.

7. A method comprising:
   configuring a logical object representing storage space at a first storage device to be used as a cache for a source virtual machine executing at a source computing system;
   in response to receiving a first input/output request targeted toward the logical object, storing a first identifier identifying the source virtual machine as an attribute of the logical object; and
   determining whether execution of the source virtual machine is migrated from the source computing system to a destination computing system for execution as a migrated virtual machine by detecting that the first identifier and a second identifier have changed, wherein the second identifier identifies the source computing system; and
   in response to determining that execution of the source virtual machine is migrated to the destination computing system, marking at the destination computing system, the logical object as a failed cache.

8. The method of claim 7, further comprising:
   initializing a second storage device at the destination computing system to operate as a caching device for the migrated virtual machine at the destination computing system.

9. The method of claim 8, wherein initializing the second storage device further comprises:
   obtaining a third identifier for the destination computing system.

10. The method of claim 7, further comprising:
    saving, by a caching device interface of a virtual machine monitor of the source virtual machine, the first identifier in a data structure as an attribute of the logical object.

11. The method of claim 10, wherein the caching device interface presents the logical object to a virtual interface layer of the virtual machine monitor that presents the logical object to the source virtual machine.

12. A system comprising:
a source computing system having a first processor executing a virtual machine;
a first storage device coupled to the source computing system; and
a caching device interface executing on the first processor at a virtual machine monitor of the virtual machine, the caching device interface configured to execute instructions to
configure a logical unit number (LUN) as a first cache for the virtual machine, the LUN having storage space at the first storage device;
in response to initializing the first cache, store a first identifier for identifying the virtual machine as an attribute of the LUN;
determine whether the virtual machine is migrated from the source computing system to a destination computing system for execution as a migrated virtual machine by detecting that the first identifier changes and a second identifier changes, wherein the second identifier identifies the source computing system; and
in response to determining that the virtual machine is migrated, mark the LUN as a failed cache.

13. The system of claim 12, further comprising:
a caching driver executing on a second processor of the destination computing system, the caching driver configured to execute instructions to initialize a second storage device coupled to the destination computing system to operate as a second cache for the migrated virtual machine at the destination computing system.

14. The system of claim 13, wherein the instructions to initialize the second storage device, further comprises instructions to:
obtain a third identifier for the destination computing system.

15. The system of claim 12, wherein the caching device interface presents the LUN to a virtual interface layer that presents the LUN to the migrated virtual machine.

16. The system of claim 15, wherein the migrated virtual machine and the virtual interface layer are executed on different computing devices.

17. The system of claim 15, wherein the migrated virtual machine and the virtual interface layer are executed on a same computing device.

18. A system, comprising:
a source computing system having a processor executing a virtual machine;
a first storage device coupled to the source computing system;
a caching device interface executing instructions on the processor to configure a logical object as a cache for the virtual machine, the logical object representing storage space at a first storage device; and
a caching driver executing at a destination computing system and configured to (i) obtain an identifier of the destination computing system, (ii) detect that the virtual machine is migrated to the destination computing system by determining that a first identifier identifying the virtual machine has changed and that a second identifier identifying the source computing system has changed, (iii) initialize a second storage device as a cache for the virtual machine migrated to the destination computing system, and (iv) mark the logical object as a failed cache.

19. The system of claim 18, wherein the caching device interface is further configured to execute instructions to save the first identifier as an attribute of the logical object.

20. The system of claim 19, wherein the caching device interface is further configured to execute instructions to present the logical object to a virtual interface layer that presents the logical object to the virtual machine migrated to the destination computing system.

* * * * *

UNITED STATES PATENT AND TRADEMARK OFFICE
CERTIFICATE OF CORRECTION

| | | |
|---|---|---|
| PATENT NO. | : 9,729,660 B2 | Page 1 of 1 |
| APPLICATION NO. | : 13/949550 | |
| DATED | : August 8, 2017 | |
| INVENTOR(S) | : Vivek Venkatesan et al. | |

It is certified that error appears in the above-identified patent and that said Letters Patent is hereby corrected as shown below:

In the Specification

Column 7, Line 20 reads:
"106B. This is ascertained in block 8308, where the caching"
Should read:
--106B. This is ascertained in block B308, where the caching--

Column 7, Line 37 reads:
"Block 8308 described above is used for what is referred"
Should read:
--Block B308 described above is used for what is referred--

Column 8, Line 2 reads:
"puting system 1065, then local caching device 121A needs"
Should read:
--puting system 106B, then local caching device 121A needs--

Column 8, Line 4 reads:
"In block 5316, the process first determines if the World ID"
Should read:
--In block B316, the process first determines if the World ID--

Column 8, Line 9 reads:
"(second identifier) has changed. If not, then in block 5320"
Should read:
--(second identifier) has changed. If not, then in block B320--

Signed and Sealed this
First Day of October, 2019

Andrei Iancu
*Director of the United States Patent and Trademark Office*